United States Patent
Boxwell et al.

(10) Patent No.: US 11,132,408 B2
(45) Date of Patent: Sep. 28, 2021

(54) KNOWLEDGE-GRAPH BASED QUESTION CORRECTION

(71) Applicant: International Business Machines Corporation, Armonk, NY (US)

(72) Inventors: Stephen A. Boxwell, Columbus, OH (US); Kyle M. Brake, Dublin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 15/864,353

(22) Filed: Jan. 8, 2018

(65) Prior Publication Data

US 2019/0213280 A1 Jul. 11, 2019

(51) Int. Cl.
*G06F 16/00* (2019.01)
*G06F 16/951* (2019.01)
(Continued)

(52) U.S. Cl.
CPC ........ *G06F 16/951* (2019.01); *G06F 16/2453* (2019.01); *G06F 16/2455* (2019.01);
(Continued)

(58) Field of Classification Search
CPC .. G06F 16/9024; G06F 40/30; G06F 16/2455; G06F 16/24578; G06F 16/248; G06F 16/3329; G06F 16/243; G06F 16/345; G06F 16/24522; G06F 16/24564; G06F 16/3331; G06F 16/951; G06F 16/9558; G06F 40/279; G06F 40/295; G06F 11/3664; G06F 11/368; G06F 11/3688; G06F 16/217; G06F 16/23; G06F 16/2365; G06F 16/2379; G06F 16/2453; G06F 16/2468; G06F 16/285; G06F 16/3344; G06F 16/367; G06F 16/637; G06F 16/90335;
(Continued)

(56) References Cited

U.S. PATENT DOCUMENTS 9,679,558 B2 6/2017 Akbacak et al.
9,798,829 B1 * 10/2017 Baisley ............... G06F 16/9024
(Continued)

OTHER PUBLICATIONS

Peter Mell, "The NIST Definition of Cloud Computing," Special Publication 800-145; pp. 1-7, Sep. 2011.
(Continued)

*Primary Examiner* — Shyue Jiunn Hwa
(74) *Attorney, Agent, or Firm* — Ingrid M Foerster; Otterstedt, Wallace & Kammer, LLP

(57) ABSTRACT

A method includes receiving, by a computer system configured to generate search result, a query, identifying a plurality of entities in the query, determining, using a knowledge graph, a measure of a relationship between the entities in the query, identifying a replacement entity for a first entity of the entities in the query, wherein the replacement entity is determined to improve the measure of the relationship between the entities when the first entity is replaced by the replacement entity, and generating a search result using the query modified by the replacement entity, which replaces the first entity in the query.

19 Claims, 8 Drawing Sheets

(51) Int. Cl.
*G06N 5/02* (2006.01)
*G06F 16/28* (2019.01)
*G06F 16/2453* (2019.01)
*G06F 16/2455* (2019.01)
*G06F 16/2452* (2019.01)
*G06F 16/9535* (2019.01)
*G06F 16/901* (2019.01)
*G06F 16/33* (2019.01)

(52) U.S. Cl.
CPC ...... *G06F 16/24522* (2019.01); *G06F 16/288* (2019.01); *G06F 16/3344* (2019.01); *G06F 16/9024* (2019.01); *G06F 16/9535* (2019.01); *G06N 5/022* (2013.01)

(58) Field of Classification Search
CPC .......... G06F 16/93; G06F 16/95; G06F 17/28; G06F 17/30654; G06F 17/30657; G06F 17/30766; G06F 3/16; G06F 40/151; G06F 40/20; G06F 40/205; G06F 40/216; G06F 40/289; G06F 40/40; G06F 40/44; G06F 40/58; G06F 8/71; G06F 16/24526; G06F 16/9038; G06F 16/2423; G06F 16/832; G06F 16/90324; G06F 16/90328; G06F 16/22; G06F 16/2228; G06F 16/282; G06F 16/29; G06F 16/904; G06F 2111/10; G06F 30/20; G06F 40/211; G06F 40/35; G06F 16/288; G06F 16/355; G06F 16/36; G06F 16/9535; G06F 21/316; G06F 21/36; G06F 16/00; G06F 16/24568; G06F 16/254; G06F 16/337; G06F 16/35; G06F 21/10; G06F 40/284
See application file for complete search history.

(56) References Cited

U.S. PATENT DOCUMENTS

| | | | |
|---|---|---|---|
| 9,953,085 B1* | 4/2018 | Collins | G06F 16/337 |
| 10,198,491 B1* | 2/2019 | Semturs | G06F 16/951 |
| 2014/0280307 A1 | 9/2014 | Gupta et al. | |
| 2014/0379755 A1* | 12/2014 | Kuriakose | G06F 16/24522 707/780 |
| 2015/0269176 A1* | 9/2015 | Marantz | G06F 16/90324 707/767 |
| 2017/0109355 A1 | 4/2017 | Li et al. | |
| 2018/0053098 A1* | 2/2018 | Beller | G06N 5/022 |

OTHER PUBLICATIONS

Seyler, D.; "Question Generation from Knowledge Graphs"; Masters Thesis in Computer Science, University of Denmark; pp. 1-118, Oct. 2015.

Araki, J. et al.; "Generating Questions and Multiple-Choice Answers using Semantic Analysis of Texts"; Language Technologies Institute, Carnegie Mellon University; pp. 1125-1136, Dec. 11-17, 2016. Osaka, Japan.

IBM; "A System & Method to Identify Correct Candidates for Question Answering over Structured Knowledge"; http://ip.com/IPCOM000180748D; pp. 1-4, Mar. 16, 2009.

Meij, E. et al.; "Method and System for Automatically Explaining Entity Relationships in a Knowledge Graph"; http://ip.com/IPCOM/000242025D; pp. 1-3, Jun. 15, 2015.

Anonymously; "Ontology Based Query Correction without Query Logs"; http://ip.com/IPCOM/000247799D; pp. 1-6, Oct. 6, 2016.

* cited by examiner

KNOWLEDGE-GRAPH BASED QUESTION CORRECTION

The present disclosure relates generally to guided computer interactions and more particularly to an interface and method thereof for guiding computer Web search interactions.

In the field of search or data mining, the quality of a query can affect the quality of the results. Precise and accurate queries are more likely to produce meaningful results.

BRIEF SUMMARY

According to an embodiment of the present invention, a method includes receiving, by a computer system configured to generate search result, a query, identifying a plurality of entities in the query, determining, using a knowledge graph, a measure of a relationship between the entities in the query, identifying a replacement entity for a first entity of the entities in the query, wherein the replacement entity is determined to improve the measure of the relationship between the entities when the first entity is replaced by the replacement entity, and generating a search result using the query modified by the replacement entity, which replaces the first entity in the query.

According to an embodiment of the present invention, a method performed by a computer server configured to generate a search result in response to a query received from a client device includes communicating user interface code to the client device, the user interface code configured to enable the client device to provide the query to the computer server, receiving the query, identifying a plurality of entities in the query, determining, using a knowledge graph, a measure of a relationship between the entities in the query, identifying a replacement entity for a first entity of the entities in the query, wherein the replacement entity is determined to improve the measure of the relationship between the entities when the first entity is replaced by the replacement entity, generating the search result using the query modified by the replacement entity, which replaces the first entity in the query, and communicating the search results to the client device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Improved search results.
Reduced network traffic by avoiding communication of unneeded search results.
Lower resource requirements by eliminating unintended searches.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
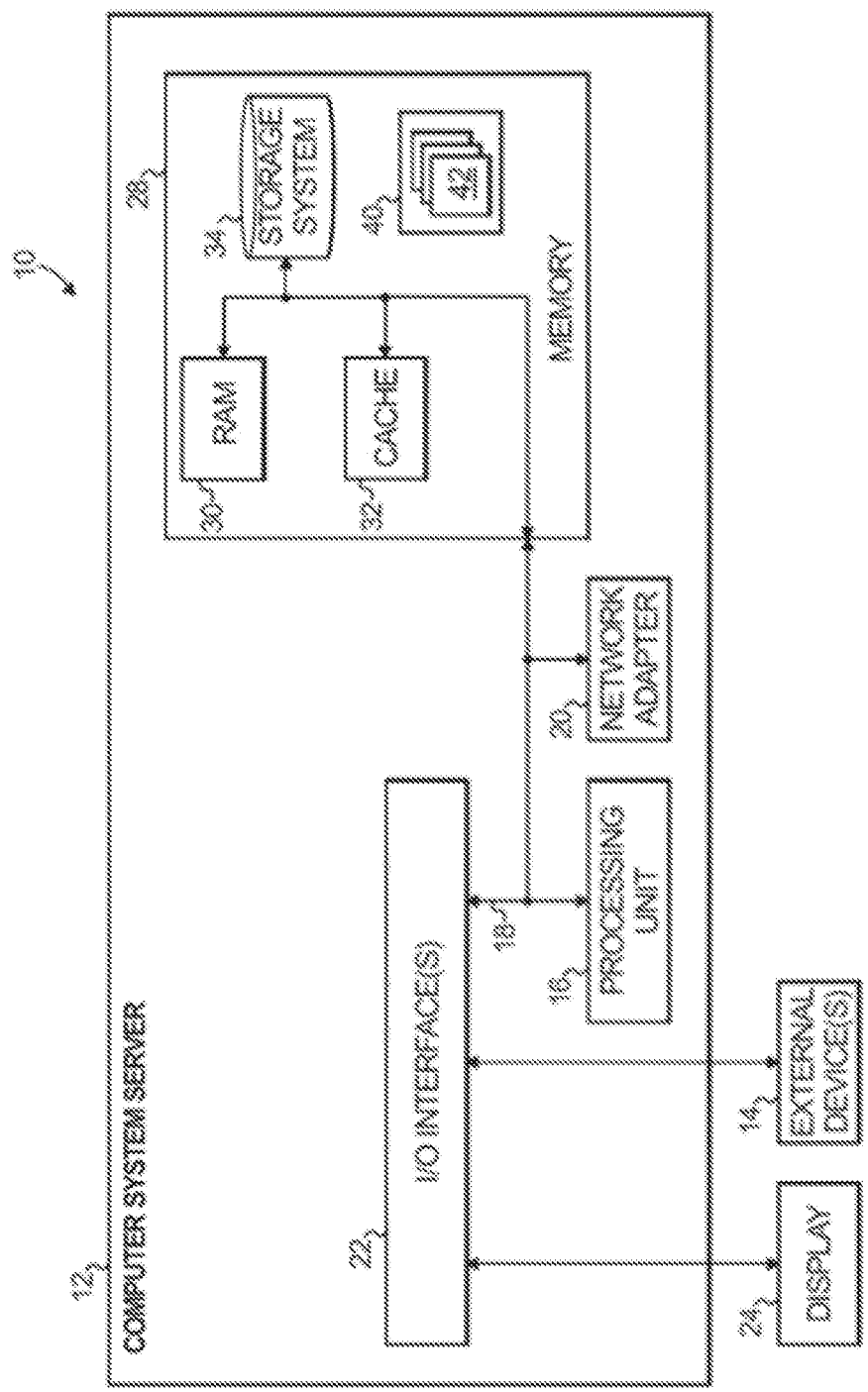
FIG. 1 depicts a cloud computing node according to an embodiment of the present invention.

According to an embodiment of the present invention, a computer system is configured to use a knowledge graph to identify an error candidate in a query. According to an embodiment of the present invention, the computer system guides a Web search by finding an error candidate in a query that is not well connected to other entities in the query, and identifying one or more replacement entities for the error candidate.

Exemplary data-driven knowledge graphs are densely-connected high-recall knowledge graphs. Exemplary knowledge graphs encode data in the form of an ontology, wherein entities and their interrelations are organized. The ontology is based on logical formalisms that support inference. Exemplary knowledge graphs support the application of graph-computing techniques and algorithms.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
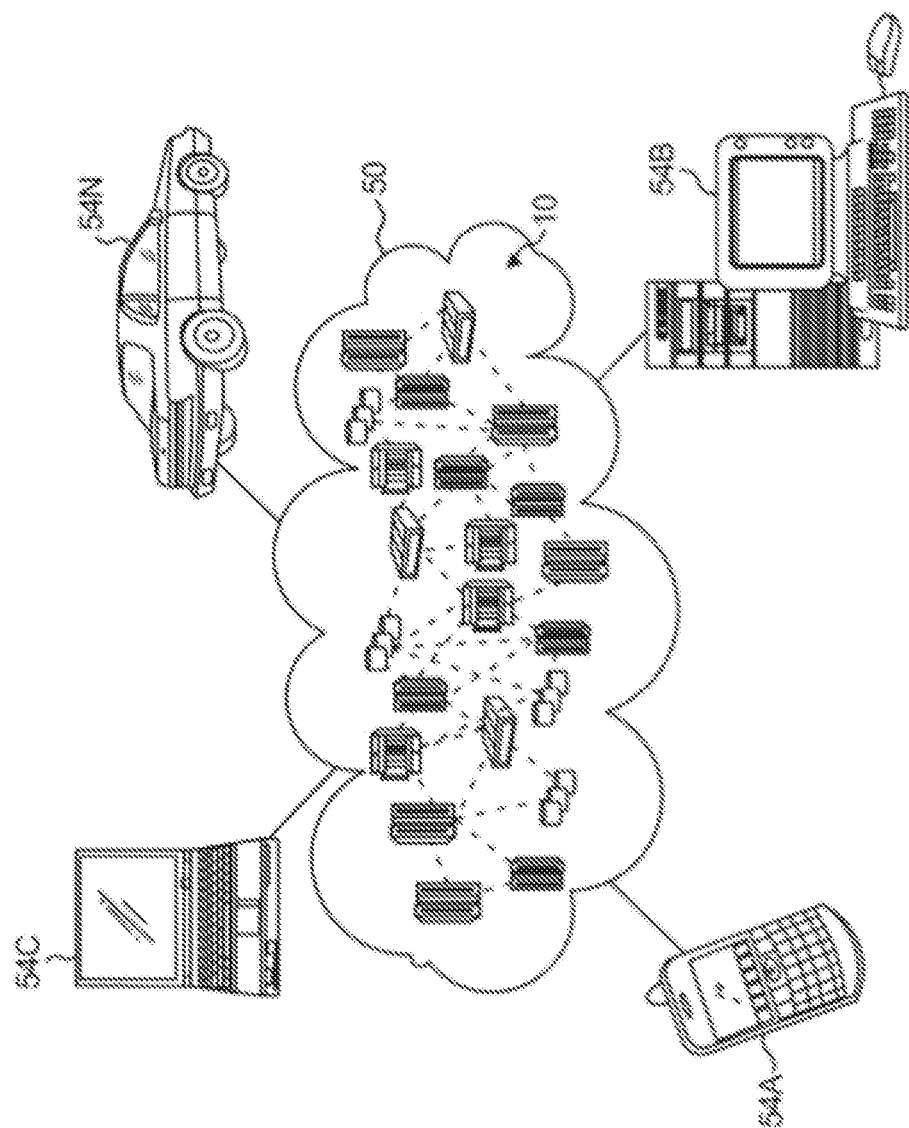
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
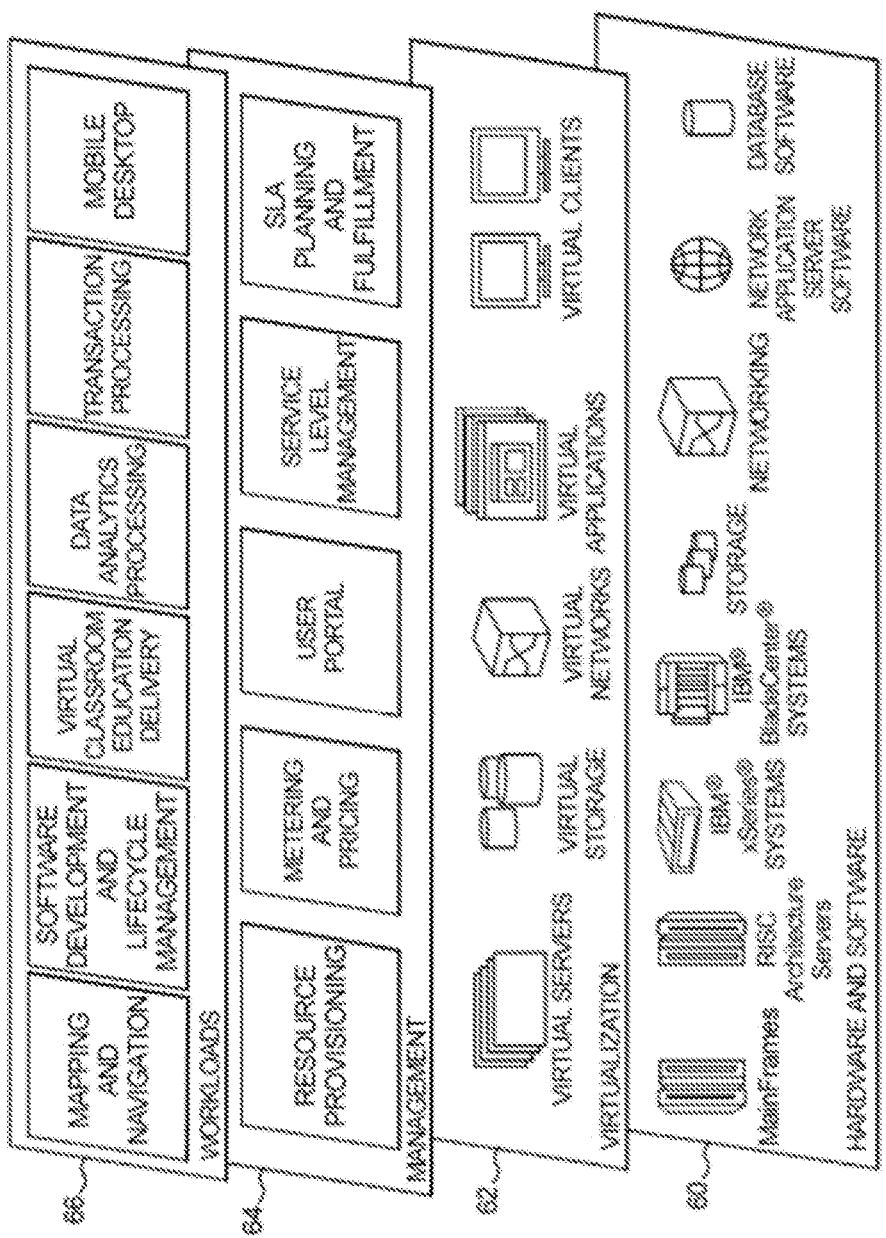
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer search engines receive input of various qualities. In a case where a user confuses two entities, the input query may be nonsensical. For example, in the query "In what year did Lee Harvey Oswald shoot Abraham Lincoln in Ford's Theater?" the user is likely confusing Lee Harvey Oswald, who assassinated United States President John F. Kennedy, with John Wilkes Booth, the actor and assassin of Abraham Lincoln. In another example, in the query "Who went on the Apollo 11 mission with Neil Armstrong and Buzz Lightyear?" the user is likely confusing the fictional cartoon character Buzz Lightyear with former astronaut Buzz Aldrin (Edwin Eugene Aldrin Jr.). In a further example, in the query "What android served on the USS Enterprise under Emile Picard?" the user is likely confusing the French mathematician Emile Picard with Jean-Luc Picard, the fictional Captain of the USS Enterprise-D in the Star Trek series. The exemplary errors are not spelling errors, rather they reflect a genuine confusion between named entities or concepts. The nature of these errors makes them resistant to traditional spelling and grammar correction tools.

In the case of an uncorrected search, unexpected, unneeded or unhelpful results are likely. For example, in the case of the query "In what year did Lee Harvey Oswald shoot Abraham Lincoln in Ford's Theater?" the results of a conventional search engine are likely to point to data sources including documents, websites, etc. that merely mention Presidents Lincoln and Kennedy, or ones that include information on coincidences between the two assassinations. These data sources are not likely to include the expected results, i.e., the year 1865.

According to an embodiment of the present invention, a computer system is configured to proposed or make corrections that are data-driven and informed by a project domain. In each of the exemplary queries above there are three entities given in the respective query. Two of the entities have a common context or domain, while the third entity does not share the context or domain. The third entity is the odd one out.

Figure 4:
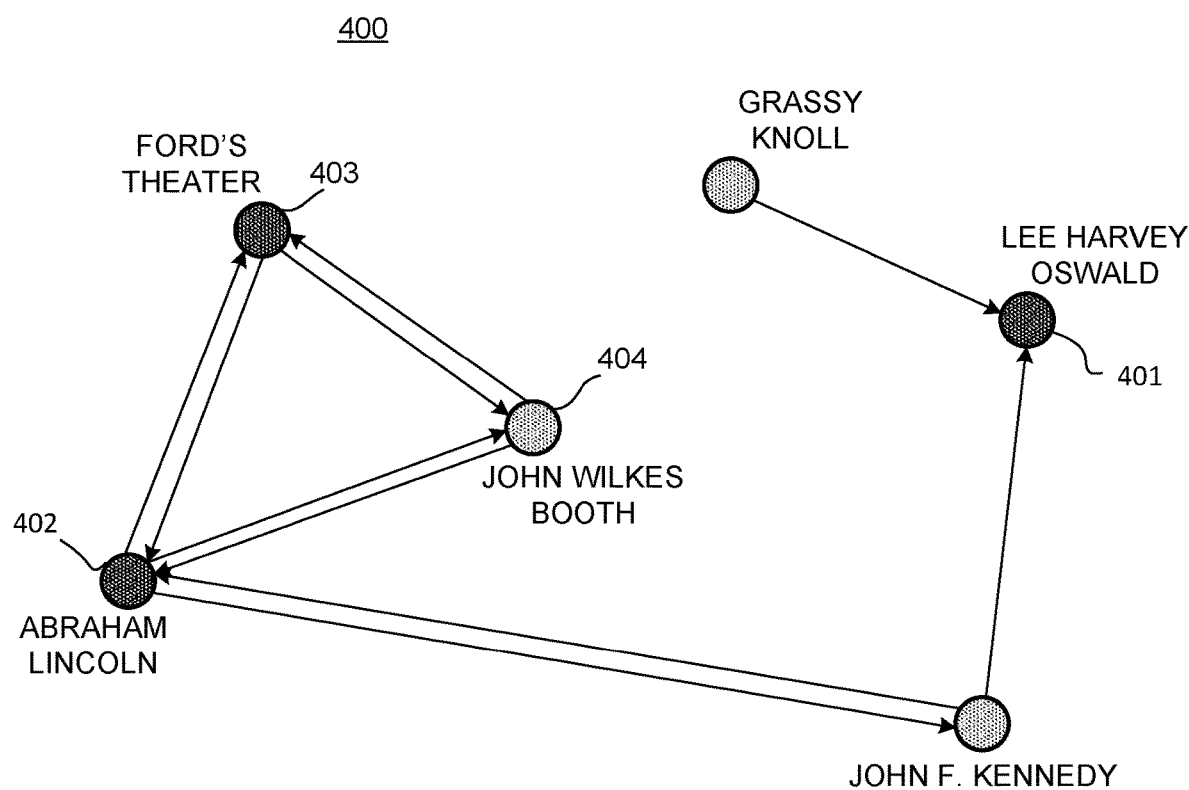
FIG. 4 is an illustration of a data-driven knowledge graph used to configure a computer system to identify error candidates according to an embodiment of the present invention.

FIG. 4 is an illustration of a data-driven knowledge graph 400 applied to exemplary query (1), where there is a disconnection between Lee Harvey Oswald and President Abraham Lincoln and Ford's Theater. In each example, the lack of connection between the third entity and the other entities in the query is reflected in the data-driven knowledge graph 400. More particularly, the node 401, which is associated with "Lee Harvey Oswald," is not closely connected to the nodes (402-403) associated with Abraham Lincoln and Ford's Theater. Rather, the node 404 associate with John Wilkes Booth is closely connected to the other entities in the question, i.e., Abraham Lincoln and Ford's Theater. According to an embodiment of the present invention, the computer system uses the data-driven knowledge graph 400 to determine that the user has confused Lee Harvey Oswald and John Wilkes Booth, intending to specify John Wilkes Booth in the query.

According to an embodiment of the present invention, the computer system identifies questions with a single odd-one-out node, identifying the node as an error candidate. The computer system identifies an alternate node, associated with a replacement entity that can replace the error candidate based on connections in the knowledge graph. According to an embodiment of the present invention, the computer system replaces the error candidate in the query with the replacement entity. According to an embodiment of the present invention, the computer system identifies the error to the user, offering the user the opportunity to confirm or deny the proposed correction. In at least one embodiment of the present invention, the computer system submits the modified query to a search engine.

According to an embodiment of the present invention, a method 500 (see FIG. 5) is performed by a computer system configured to propose a substitute term to replace an error candidate in a query (or automatically replace the error candidate). The computer system receives the query from a user device 501. The computer system parses the query to identify a set of entities, and for each entity in the set (502), provisionally removes the entity (i.e., a held-out entity) from the set 503, and finds at least one potential substitute that is related to the remaining entities in the set 504. Once all the potential substitutes are identified (505), the method considers each potential substitute in turn (506). The computer system further considers each member of the set of potential substitutes in turn (506/509) by determining if a given potential substitute is similar to the held-out entity (507) and if the potential substitute is similar to the held-out entity, the potential substitute is offered as a proposed substitute to the user 508.

Referring to block 502, an exemplary method of parsing the query uses output of a syntactic parser, such as the XSG parser, The Stanford Parser, the Clark and Curran CCG Parser, or another syntactic/semantic parser, to identify proper nouns. For example, the XSG parser groups together words that form an entity using syntactic cues, even if that entity is not in a dictionary. It should be understood that the parsing can be performed using an existing product and that embodiments of the present invention are not limited to the examples provided herein.

According to one or more embodiments of the present invention, the method of block 506 can performed after the method of block 509, such that the method iterates through members F(f) as each entity e is removed from the set of entities E.

According to an embodiment of the present invention, the user interface (i.e., an interface to the search engine) is augmented with a menu of potential substitutes, configured to receive a user selection modifying the original query by replacing the error candidate with the selected potential substitute. In at least one exemplary embodiment of the present invention, the user interface it presented as a text box in a graphical user interface display by the user's device or provided via a spoken language interface (e.g., a digital assistant).

The following algorithm pseudocode (see also the exemplary method 500 shown in FIG. 5) describes an exemplary method of identifying a substitute entity according to an embodiment of the present invention:

Let E be a set of entities in a query. (501)
Let s1 be a measure of proximity among all the values of E.
    For each member of E(e): (502/505)
    provisionally remove e from set E; and (503)

find entities f that are closely related to one or more of the remaining members of E. (504)

For each member of F(f) (where F is the set of all found entities f): (506/509)

determine if f is similar to the provisionally removed e and the s1 is improved; and (507)

if f is similar to the provisionally removed e and s1 is improved, propose f as a substitute for e. (508)

According to an embodiment of the present invention, s1 is calculated for E giving a measure of a group proximity of E. That is, the entities of E are determined, as a group, to have a certain proximity s1. The value of s1 is used to determine if f is a better match than a provisionally removed e. For example, at 507, if f is determined to be easily confused with e (e.g., if f and e are of a similar type (e.g., person, place, thing), and/or are similar-sounding), and the measure of proximity s1 is improved by removing e from E and adding f then f is recommended or used as a substitute for e. An exemplary improvement is s1 would be a reduction in s1, indicating that the provisional entities of E (i.e., excluding e and including j), as a group, are closer together than the initial set of entities in E.

According to an embodiment of the present invention, entities f that are closely related (504) to the remaining members of E are determined using a measure of semantic similarity, for example, using thesaurus extraction, word clustering, Pointwise mutual information (PMI), and the like. According to an embodiment of the present invention, similarity is determined (507) as a measure of semantic similarity using a taxonomy defining similarities between different entities. For example, two entities that have a partial name match (e.g., literal word token overlaps) can be defined as being similar. In at least one example, a list of typically confused entities (e.g., Austria/Australia) is used, and when an entity e is determined, one or more corresponding entities f are determined. Using the question "What year did Neil Armstrong and Buzz Lightyear travel to the moon on Apollo 11?" as an example, the entity "Buzz Lightyear" is provisionally removed (chosen as e (503)). The candidate entities for f are then identified that are closely related to the remaining entities "Neil Armstrong", "moon" and "Apollo 11." For example, candidates for f are determined as "NASA," "United States," and "Buzz Aldrin" using a word cluster. Of these candidates for f "Buzz Aldrin" is determined to be most similar to "Buzz Lightyear," for example, using a determination of similarity based on overlap in the terms.

It should be understood that the similarity between entities can be determined using a variety of methods. Exemplary methods of determining similarly as described herein are not intended to be limiting.

Figure 6:
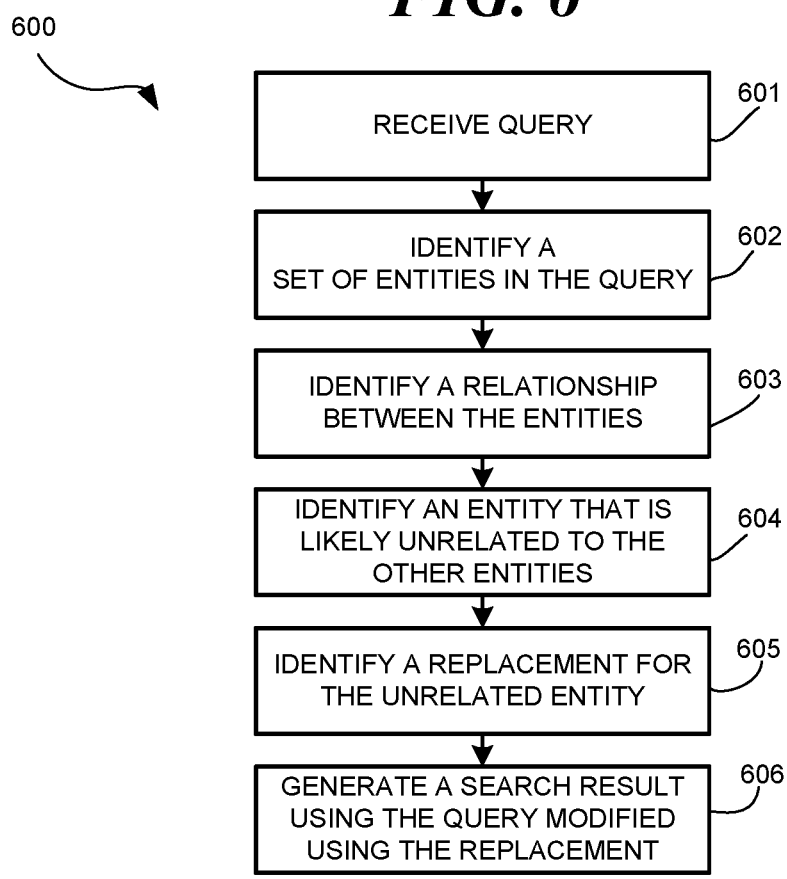
FIG. 6 is a flow diagram of a computer implemented method for correcting a query according to an embodiment of the present invention.

According to an embodiment of the present invention, a method 600 (see FIG. 6) is performed by a computer system is configured to propose a substitute term to replace an error candidate in a query (or automatically replace the error candidate). The computer system receives the query from a user device 601. The computer system identifies a plurality of entities in the query (602), identifies, from a knowledge graph (see for example, FIG. 4), relationships between the entities (603), identifies, using the knowledge graph, a first entity of the entities in the query that is likely unrelated to a remaining set of entities in the query (604), identifies a replacement for the first entity (605), and generates a search result using the query modified by the at least one replacement for the first entity (606).

According to an embodiment of the present invention, a knowledge graph is used to identify relationships between entities (603). A knowledge graph is a graph-style representation of entities and their relationships. The knowledge graph can be constructed form annotated relations, like in Dbpedia, using relationships that are learned from free text, like those learned by an annotator like SIRE, among other methods.

According to an embodiment of the present invention, the identification of the first entity of the entities in the query that is likely unrelated to the remaining set of entities in the query (604) is performed by considering each entity in turn. In the case of the entity "Neil Armstrong" (taken from the exemplary question above), the entity is provisionally removed from E. Of the possible entities that are related to "Buzz Lightyear", "moon" and "Apollo 11", it is unlikely an entity f is found that both improves s1 and is similar to (e.g., easily confused with) "Neil Armstrong." Thus, the entity "Neil Armstrong" is maintained in E. The method continues to consider each entity.

It should be understood that the replacement can be selected or confirmed by a user, where the computer system communicates the replacement for the first entity to a device providing the query to the system and waits for a confirmation to proceed with the query modified using the replacement for the first entity.

Figure 7:
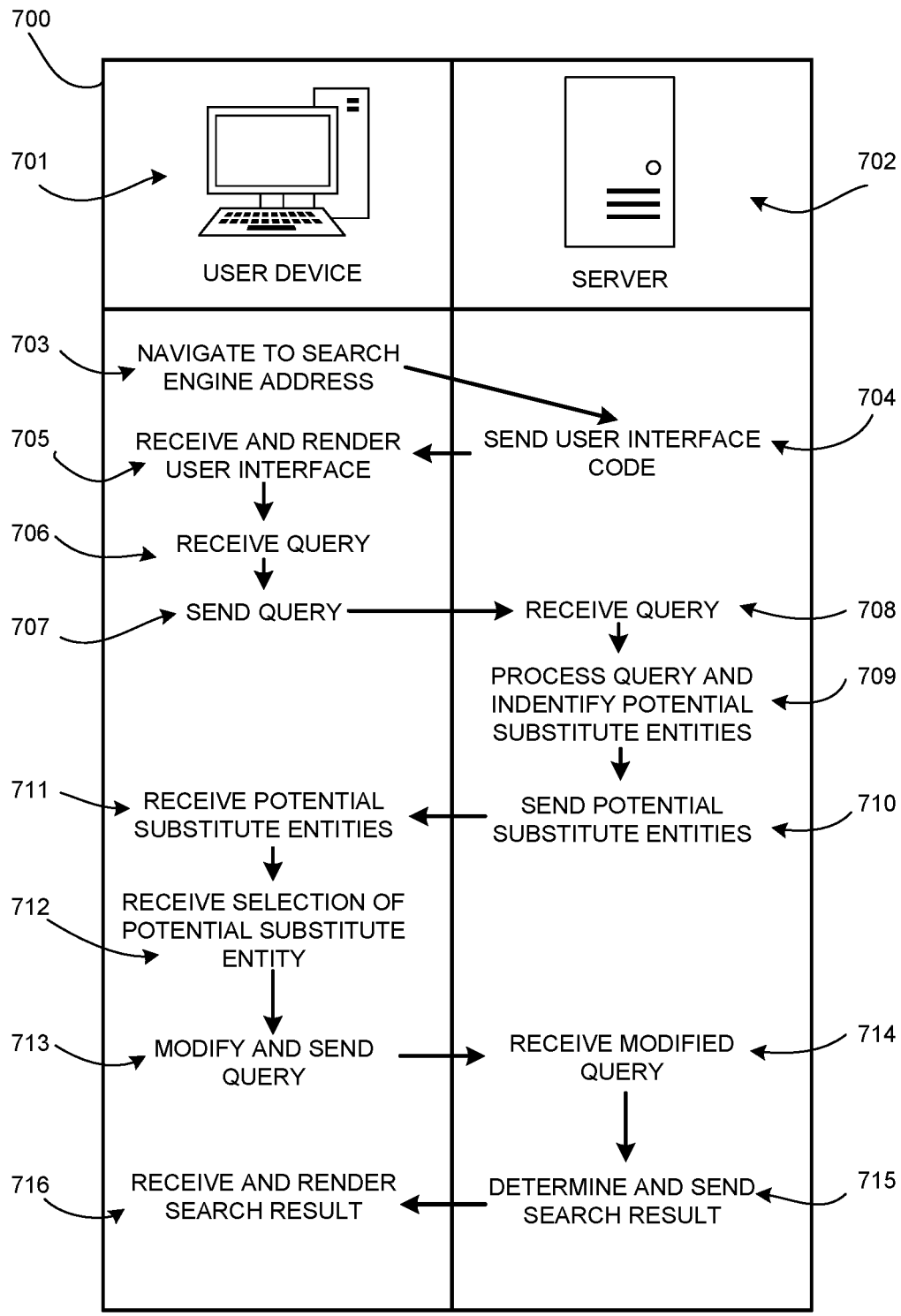
FIG. 7 is a swim lane diagram illustrating exemplary communications between a user device and a server according to an embodiment of the present invention.

According to an embodiment of the present invention, a computer system is configured to use a densely-connected high-recall knowledge graph to identify an error candidate in a query. In this context, FIG. 7 is a swim lane diagram 700 illustrating exemplary communications between a user device 701 and the computer system 702 implemented as a webserver according to an embodiment of the present invention. The webserver disposed on a network and is accessible to a user's device via a network. Upon navigating to a search engine running on the webserver 703, the webserver provides code (e.g., HTML) to the user's device 704 defining a user interface. The user's device received the node and renders a user interface of the search engine 705. The user's device receives a user's search query 606 and provides the query as input to the webserver via the interface 707. In this way the webserver receives the query 708 from the user's device and processes the query to determine whether the query contains, or is likely to contain, an error candidate 709. Upon determining that an error is likely, the server sends potential substitute entities to the user's device 710. The user's device receives the potential substitute entities 711, which are presented to the user for selection. The user provides a selection 712, modifying the query 713, which is forwarded to the server. The server receives the modified query 714 and determines a search result, which is communicated to the user's device 715. The user's device receives and renders the search result 716, which was generated using the modified query.

Figure 5:
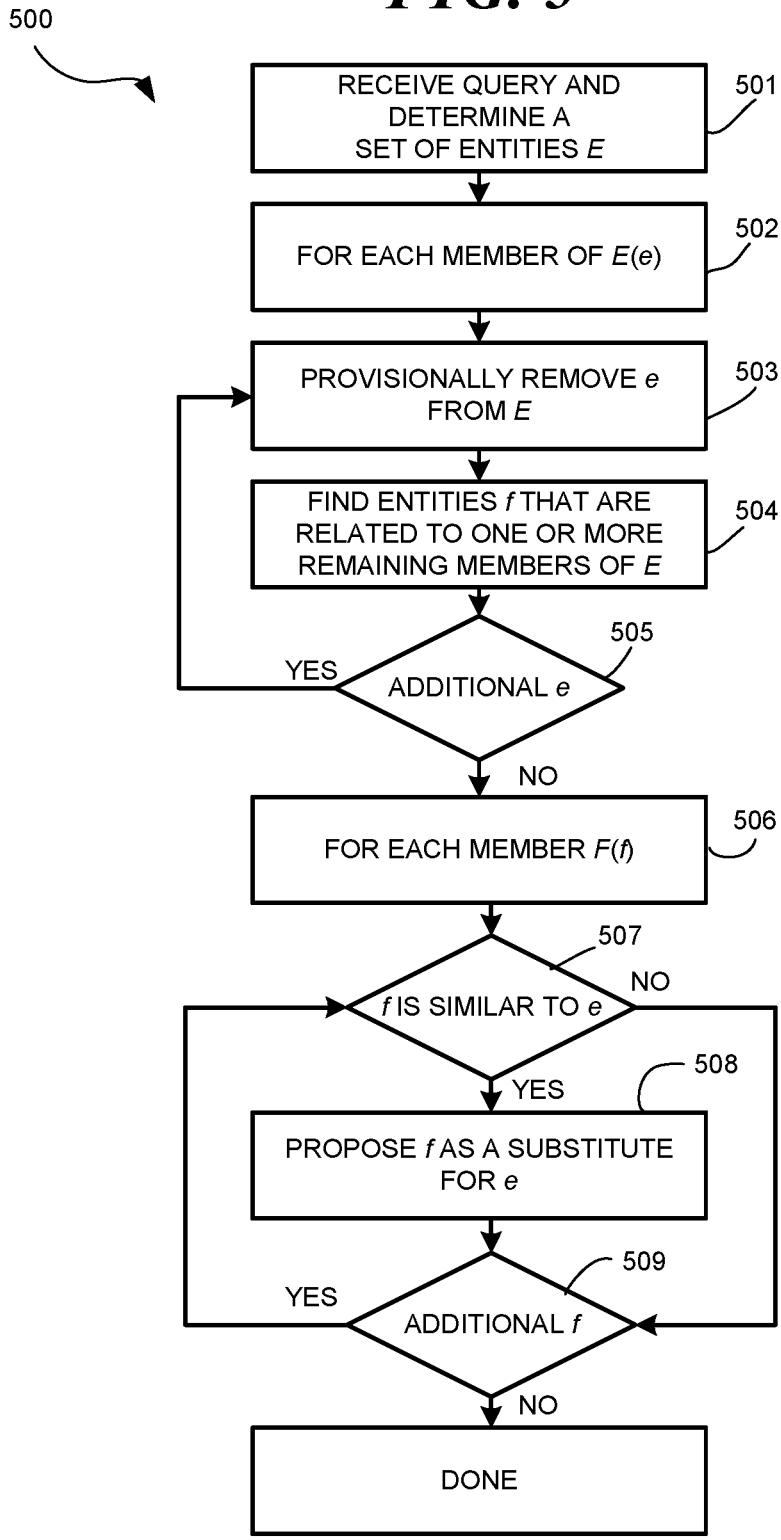
FIG. 5 is a flow diagram of a computer implemented method for correcting a query according to an embodiment of the present invention.

According to at least one embodiment of the present invention, a user's device executes code that automatically processes a query prior to providing the query to a search engine executing at a server disposed on a network. With reference to FIG. 5, it should be understood that block 508 includes automatically substituting f for e.

In at least another embodiment, a user's query is intercepted by an intermediary computer system disposed between the user's device and the server executing a search engine. The intermediary computer system processes the query to determine whether the query contains, or is likely to contain, an error candidate.

According to an embodiment of the present invention, a computer system provides a list of candidate replacement entities to a user. Entities in the list can be selected by the user as replacement entities, replacing an error candidate in the query. According to an embodiment of the present invention, the list can be a pop-up window.

Recapitulation:

According to an embodiment of the present invention, a method includes receiving, by a system configured to generate search result, a query (501/708), identifying a plurality of entities in the query (501/709), identifying, from a knowledge graph, relationships between the entities (709), identifying, using the knowledge graph, a first entity of the entities in the query that is likely unrelated to a remaining set of entities in the query (709), identifying at least one replacement for the first entity (714), and generating a search result using the query modified by the at least one replacement for the first entity (715).

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for generating a 4D model during a PCI procedure. Further, a computer program product can include a tangible computer-readable recordable storage medium with code adapted to be executed to carry out one or more method steps described herein, including the provision of the system with the distinct software modules.

Figure 8:
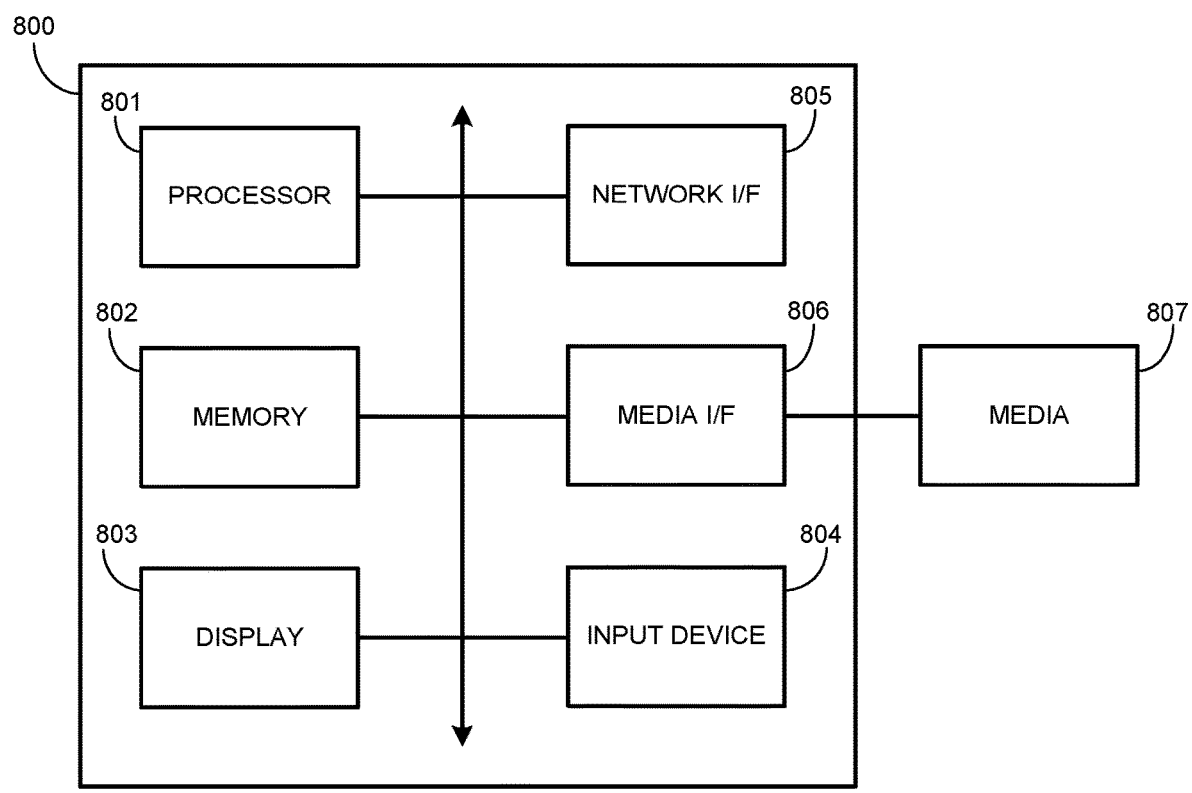
FIG. 8 is a block diagram depicting an exemplary computer system embodying a method for correcting a query according to an exemplary embodiment of the present invention.

Referring to FIG. 8; FIG. 8 is a block diagram depicting an exemplary computer system 800 embodying the computer system for identifying and replacing an error candidate in a query. The computer system 800 shown in FIG. 8 includes a processor 801, memory 802, display 803, input device 804 (e.g., keyboard), a network interface (I/F) 805, a media I/F 806, and media 807, such as a signal source, e.g., camera, Hard Drive (HD), external memory device, etc.

In different applications, some of the components shown in FIG. 8 can be omitted. The whole system shown in FIG. 8 is controlled by computer readable instructions, which are generally stored in the media 807. The software can be downloaded from a network (not shown in the figures), stored in the media 807. Alternatively, software downloaded from a network can be loaded into the memory 802 and executed by the processor 801 to complete the function determined by the software.

The processor 801 may be configured to perform one or more methodologies described in the present disclosure, illustrative embodiments of which are shown in the above figures and described herein. Embodiments of the present invention can be implemented as a routine that is stored in memory 802 and executed by the processor 801 to process the signal from the media 807. As such, the computer system is a general-purpose computer system that becomes a specific purpose computer system when executing routines of the present disclosure.

Although the computer system described in FIG. 8 can support methods according to the present disclosure, this system is only one example of a computer system. Those skilled of the art should understand that other computer system designs can be used to implement embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    receiving, by a computer system configured to generate search result, a query;
    identifying a plurality of entities in the query;
    determining, using a knowledge graph, a measure of a relationship between the entities in the query;
    identifying a replacement entity for a first entity of the entities in the query, wherein the replacement entity is determined to improve the measure of the relationship between the entities when the first entity is replaced by the replacement entity,
        wherein identifying the replacement entity for the first entity of the entities comprises:
        determining that the replacement entity is similar to the first entity; and
        determining that the measure of the relationship between the plurality of entities when the replacement entity replaces the first entity is an improvement over the measure of the relationship between the plurality of entities in the query; and
    generating a search result using the query modified by the replacement entity, which replaces the first entity in the query.

2. The method of claim 1, wherein the identifying, determining the measure, identifying the replacement entity, and generating the search result are performed by the computer system and the search result is an answer to the query.

3. The method of claim 1, further comprising communicating the search results from the computer system to a device providing the query received by the computer system.

4. The method of claim 1, further comprising:
    communicating the replacement entity for the first entity to a device providing the query received by the computer system; and
    receiving, by the computer system, from the device providing the query, a confirmation of the replacement entity for the first query, wherein the search result is generated by the computer system upon receiving the confirmation.

5. The method of claim 1, wherein identifying the replacement entity for the first entity of the entities comprises iteratively considering each entity of the plurality of entities.

6. The method of claim 1, wherein identifying the replacement entity for the first entity of the entities comprises:
    iteratively considering each entity e of the plurality of entities E until the replacement entity is determined, wherein in a final iteration the method comprises:

removing, provisionally, the entity e from the plurality of entities E of the query;
finding a member entity f that is related to at least one of the remaining members of the plurality of the entities E based on a group proximity of the remaining members of the plurality of the entities E and the member f;
determining that the member f is similar to the provisionally removed entity e and that the group proximity of the remaining members of the plurality of the entities E and the member f is an improvement over the measure of the relationship between the entities in the query; and
wherein the member f is identified as the replacement entity for the first entity of the entities in the query, and the first entity is the entity e in the final iteration.

7. The method of claim 1, wherein the measure of the relationship is identified by determining a group proximity of the entities in the query.

8. A non-transitory computer readable medium comprising computer executable instructions which when executed by a computer configured to generate search result cause the computer to perform a method, said method comprising:
receiving a query;
identifying a plurality of entities in the query;
determining, using a knowledge graph, a measure of a relationship between the entities in the query;
identifying a replacement entity for a first entity of the entities in the query, wherein the replacement entity is determined to improve the measure of the relationship between the entities when the first entity is replaced by the replacement entity,
wherein identifying the replacement entity for the first entity of the entities comprises:
determining that the replacement entity is similar to the first entity; and
determining that the measure of the relationship between the plurality of entities when the replacement entity replaces the first entity is an improvement over the measure of the relationship between the plurality of entities in the query; and
generating a search result using the query modified by the replacement entity, which replaces the first entity in the query.

9. The computer readable medium of claim 8, wherein the identifying, determining the measure, identifying the replacement entity, and generating the search result are performed by the computer system and the search result is an answer to the query.

10. The computer readable medium of claim 8, wherein the method further comprises communicating the search results to a device providing the query received by the computer system.

11. The computer readable medium of claim 8, further comprising:
communicating the replacement entity for the first entity to a device providing the query received by the computer system; and
receiving, by the computer system, from the device providing the query, a confirmation of the replacement entity for the first query, wherein the search result is generated by the computer system upon receiving the confirmation.

12. The computer readable medium of claim 8, wherein identifying the replacement entity for the first entity of the entities comprises iteratively considering each entity of the plurality of entities.

13. The computer readable medium of claim 8, wherein identifying the replacement entity for the first entity of the entities comprises;
iteratively considering each entity e of the plurality of entities F until the replacement entity is determined, wherein in a final iteration the method comprises:
removing, provisionally, the entity e from the plurality of entities E of the query;
finding a member entity f that is related to at least one of the remaining members of the plurality of the entities E based on a group proximity of the remaining members of the plurality of the entities E and the member f;
determining that the member f is similar to the provisionally removed entity e and that the group proximity of the remaining members of the plurality of the entities E and the member f is an improvement over the measure of the relationship between the entities in the query; and
wherein the member f is identified as the replacement entity for the first entity of the entities in the query, and the first entity is the entity e in the final iteration.

14. The computer readable medium of claim 8, wherein the measure of the relationship is identified by determining a group proximity of the entities in the query.

15. A method performed by a computer server configured to generate a search result in response to a query received from a client device, the method comprising:
communicating user interface code to the client device, the user interface code configured to enable the client device to provide the query to the computer server;
receiving the query;
identifying a plurality of entities in the query;
determining, using a knowledge graph, a measure of a relationship between the entities in the query;
identifying a replacement entity for a first entity of the entities in the query, wherein the replacement entity is determined to improve the measure of the relationship between the entities when the first entity is replaced by the replacement entity,
wherein identifying the replacement entity for the first entity of the entities comprises:
determining that the replacement entity is similar to the first entity; and
determining that the measure of the relationship between the plurality of entities when the replacement entity replaces the first entity is an improvement over the measure of the relationship between the plurality of entities in the query;
generating the search result using the query modified by the replacement entity, which replaces the first entity in the query; and
communicating the search results to the client device.

16. The method of claim 15, further comprising:
communicating the replacement entity for the first entity to the client device providing the query received by the computer server; and
receiving from the client device providing the query, a confirmation of the replacement entity for the first query, wherein the search result is generated upon receiving the confirmation.

17. The method of claim 15, wherein identifying the replacement entity for the first entity of the entities comprises iteratively considering each entity of the plurality of entities.

18. The method of claim 15, wherein identifying the replacement entity for the first entity of the entities comprises;
    iteratively considering each entity e of the plurality of entities E until the replacement entity is determined, wherein in a final iteration the method comprises:
    removing, provisionally, the entity e from the plurality of entities E of the query;
    finding a member entity f that is related to at least one of the remaining members of the plurality of the entities E based on a group proximity of the remaining members of the plurality of the entities E and the member f;
    determining that the member f is similar to the provisionally removed entity e and that the group proximity of the remaining members of the plurality of the entities E and the member f is an improvement over the measure of the relationship between the entities in the query; and
    wherein the member f is identified as the replacement entity for the first entity of the entities in the query, and the first entity is the entity e in the final iteration.

19. The method of claim 15, wherein the measure of the relationship is identified by determining a group proximity of the entities in the query.

\* \* \* \* \*